(12) United States Patent
Li

(10) Patent No.: US 12,501,863 B2
(45) Date of Patent: Dec. 23, 2025

(54) PLANT GROWTH ACCELERATOR

(71) Applicant: Qingling Li, Guangdong (CN)

(72) Inventor: Qingling Li, Guangdong (CN)

( * ) Notice: Subject to any disclaimer, the term of this patent is extended or adjusted under 35 U.S.C. 154(b) by 0 days.

(21) Appl. No.: 19/183,632

(22) Filed: Apr. 18, 2025

(65) Prior Publication Data
US 2025/0331470 A1     Oct. 30, 2025

(30) Foreign Application Priority Data
Apr. 27, 2024    (CN) .......................... 202420892711.3

(51) Int. Cl.
    *A01G 7/04*         (2006.01)

(52) U.S. Cl.
    CPC ..................... *A01G 7/04* (2013.01)

(58) Field of Classification Search
None
See application file for complete search history.

(56) References Cited

U.S. PATENT DOCUMENTS

| | | | | |
|---|---|---|---|---|
| 5,224,769 A * | 7/1993 | Holbrook | ........... | G01N 33/0098 |
| | | | | 47/1.01 R |
| 5,464,456 A * | 11/1995 | Kertz | ........... | A47G 7/02 |
| | | | | 47/60 |
| 6,202,479 B1 * | 3/2001 | Frybarger | ........... | G01N 33/246 |
| | | | | 73/304 C |
| 6,870,376 B1 * | 3/2005 | Gensler | ........... | A01G 25/167 |
| | | | | 324/663 |
| 7,956,624 B2 * | 6/2011 | Beaulieu | ........... | G01N 33/246 |
| | | | | 324/692 |
| 8,289,035 B1 * | 10/2012 | Gensler | ........... | G01N 27/22 |
| | | | | 324/692 |
| 8,819,988 B2 * | 9/2014 | Corsi | ........... | A01G 7/04 |
| | | | | 47/1.3 |
| 9,075,698 B2 * | 7/2015 | Stachon | ........... | A01G 7/00 |
| 11,483,981 B1 * | 11/2022 | Lo | ........... | A01G 31/06 |
| 12,433,203 B2 * | 10/2025 | Singer | ........... | B05B 5/1608 |
| 2007/0266624 A1 * | 11/2007 | Tanaka | ........... | A01G 7/04 |
| | | | | 47/1.3 |
| 2008/0190020 A1 * | 8/2008 | Todd | ........... | A01G 25/167 |
| | | | | 47/48.5 |
| 2012/0106142 A1 * | 5/2012 | Jensen | ........... | F21S 9/03 |
| | | | | 362/190 |
| 2012/0203299 A1 * | 8/2012 | Lee | ........... | A01G 7/04 |
| | | | | 607/45 |
| 2013/0231724 A1 * | 9/2013 | Hou | ........... | A61N 1/36003 |
| | | | | 607/115 |
| 2014/0100638 A1 * | 4/2014 | Hou | ........... | A61N 1/3782 |
| | | | | 607/63 |
| 2015/0027044 A1 * | 1/2015 | Redden | ........... | A01M 21/043 |
| | | | | 47/58.1 R |
| 2015/0162854 A1 * | 6/2015 | Blaunshtein | ........... | A01G 15/00 |
| | | | | 361/231 |

(Continued)

FOREIGN PATENT DOCUMENTS

FR     2638936 A   *   5/1990

*Primary Examiner* — Morgan T Jordan
(74) *Attorney, Agent, or Firm* — Hawaii Patent Services; Nathaniel K. Fedde; Kenton N. Fedde

(57) ABSTRACT

A plant growth accelerator includes a negative voltage device with a negative voltage generator. A negative electrode is electrically connected to an output terminal of the negative voltage generator. The negative electrode is configured to directly or indirectly connect to plants.

18 Claims, 4 Drawing Sheets

(56) References Cited

U.S. PATENT DOCUMENTS

| | | | |
|---|---|---|---|
| 2015/0282436 A1* | 10/2015 | Zheng | A01G 7/04 47/1.3 |
| 2017/0202154 A1* | 7/2017 | Yamamoto | A01G 7/00 |
| 2018/0213735 A1* | 8/2018 | Vail | A01G 7/045 |
| 2018/0267006 A1* | 9/2018 | Wallbridge | G01N 33/0098 |
| 2019/0203238 A1* | 7/2019 | Chen | A01H 3/02 |
| 2020/0302338 A1* | 9/2020 | Carroll | G06N 20/10 |
| 2021/0185951 A1* | 6/2021 | Ruggier | A01G 31/02 |
| 2022/0118248 A1* | 4/2022 | Cho | A61N 1/22 |
| 2022/0312685 A1* | 10/2022 | Stephen | H02M 3/33507 |
| 2022/0322609 A1* | 10/2022 | Richter | H04B 5/79 |
| 2023/0028378 A1* | 1/2023 | Stephen | F24F 3/16 |
| 2023/0050373 A1* | 2/2023 | Osinaike | A01G 15/00 |
| 2023/0180687 A1* | 6/2023 | Fu | C02F 9/00 47/62 A |
| 2023/0329154 A1* | 10/2023 | Zamanzadeh | A01G 7/04 |
| 2024/0295526 A1* | 9/2024 | Zamanzadeh | G01N 33/0098 |
| 2024/0306557 A1* | 9/2024 | Dansie | A01G 7/04 |
| 2024/0324516 A1* | 10/2024 | Castagna | H01Q 21/00 |

* cited by examiner

PLANT GROWTH ACCELERATOR

CROSS-REFERENCE TO RELATED APPLICATIONS

This application claims priority to Chinese Patent Application No. 202420892711.3, titled "A Novel Plant Growth Accelerator," filed on Apr. 27, 2024, the entire content f which, including the amendments, is incorporated herein by reference.

TECHNICAL FIELD

The present disclosure relates to the field of plant growth technology, particularly to a novel plant growth accelerator.

BACKGROUND

Traditional methods for promoting plant growth involve using chemical fertilizers to enhance crop production and yield, or employing pesticides and insecticides to eliminate insects and pests. Later, electrode technology emerged to promote plant growth, primarily through inserting electrodes into the soil.

For example, U.S. Patent No. 2024306557 discloses "A device for applying an electric charge into soil to promote plant growth." This patent involves inserting electrodes into the soil, but the soil must remain moist. During use, this method can easily burn plant roots, posing safety hazards and inconvenience. Therefore, to avoid the shortcomings of existing technologies, it is necessary to improve the prior art.

Thus, there is a need to propose a novel plant growth accelerator to address the aforementioned issues.

SUMMARY

The present disclosure provides a novel plant growth accelerator to solve the problems raised in the background art.

To achieve the above object, the present disclosure adopts the following technical solutions:

A novel plant growth accelerator includes a negative voltage device, which includes a negative voltage device, wherein the negative voltage device includes a negative voltage generator; and a negative electrode electrically connected to an output terminal of the negative voltage generator, wherein the negative electrode is directly or indirectly connected to plants.

A novel plant growth accelerator includes a negative voltage device, which includes a negative voltage device, wherein the negative voltage device includes a power supply assembly and a negative voltage generator; and wherein the power supply assembly includes a power supply that is electrically connected to the negative voltage generator; and a negative electrode electrically connected to an output terminal of the negative voltage generator, wherein the negative electrode is directly or indirectly connected to plants; and wherein the negative voltage device further includes a housing, and the power supply assembly further includes a solar panel, wherein the solar panel is disposed on the housing, and the solar panel is electrically connected to the power supply.

The beneficial effects of the present disclosure compared to existing technologies are:

By configuring the negative voltage generator to produce negative high-voltage microcurrent and connecting it to the plant via the negative electrode, the present disclosure leverages photosynthesis as the primary energy source for plant growth. Light exposure promotes molecular movement, and the negative electrode connection increases electron availability within the plant, facilitating electron migration and enhancing growth. This method also reduces pests, while the negative charge aids in the absorption of potassium, nitrogen, phosphorus, and other nutrients, further promoting plant growth. Additionally, the negative electrode can be attached to the plant without burning its roots, ensuring simplicity, safety, and a positive user experience.

BRIEF DESCRIPTION OF DRAWINGS

The drawings, which form a part of this application, are provided to further illustrate the present disclosure. The schematic embodiments and descriptions of the present disclosure are intended to explain the present disclosure and do not constitute an improper limitation thereof. In the drawings.

Figure 1:
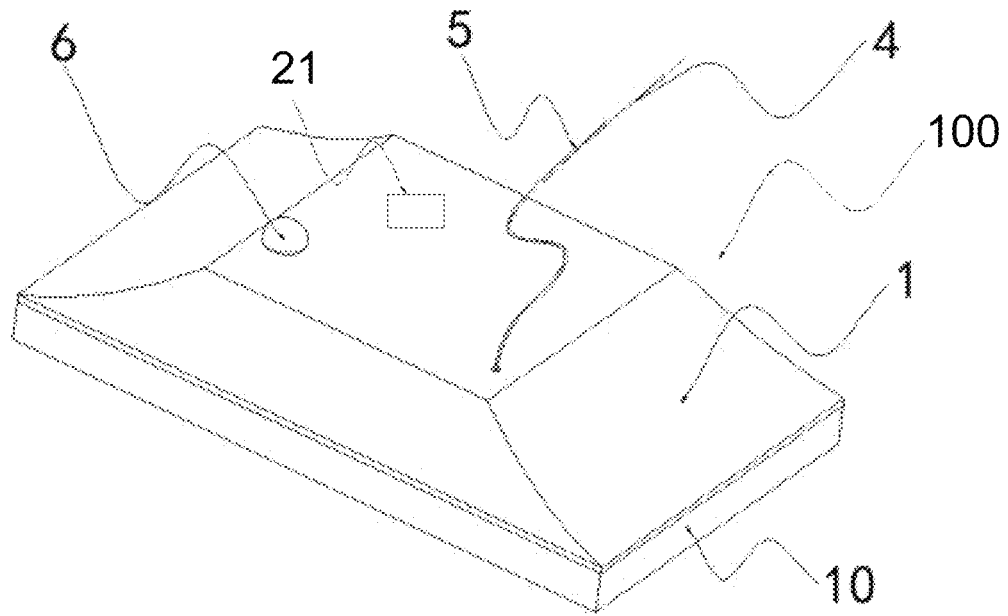
FIG. 1 is a perspective schematic diagram of an embodiment provided by the present disclosure.

Reference signs: Negative voltage device (1); Power supply (2); Negative voltage generator (3); Negative electrode (4); Wire (5); Switch (6); Control circuit board (7); Solar panel (8); Protective plate (9); Housing (10).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Figure 2:
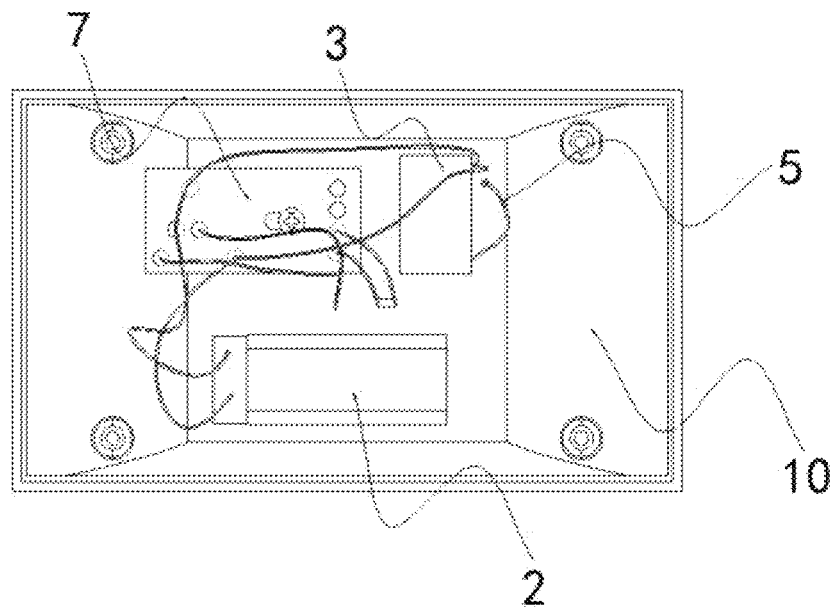
FIG. 2 is a structural schematic diagram of the power supply, negative voltage generator, wire, control circuit board, and housing.
Figure 3:
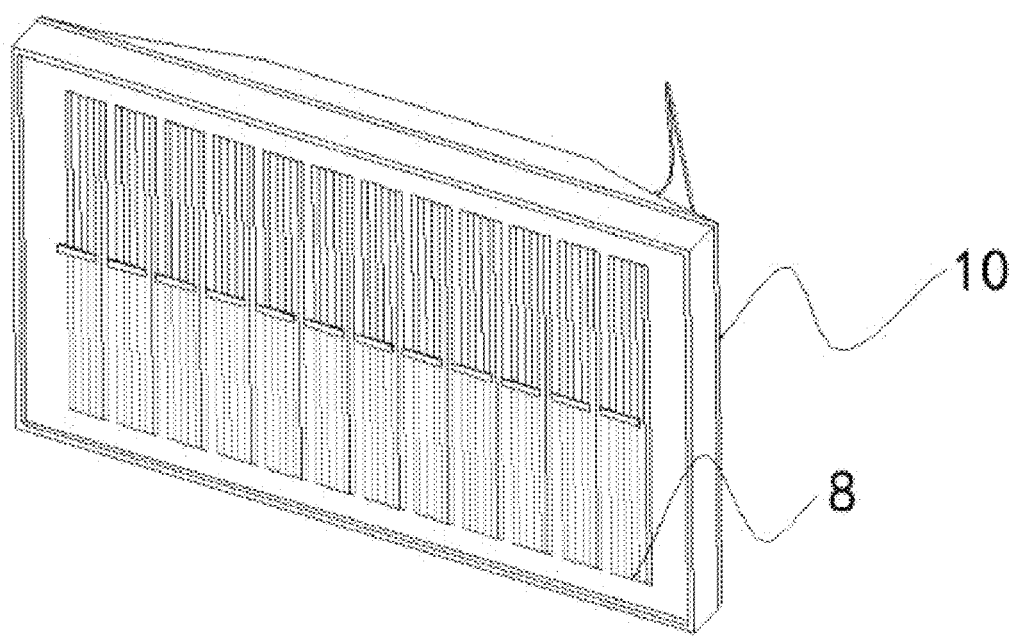
FIG. 3 is a structural schematic diagram of the solar panel and housing.
Figure 4:
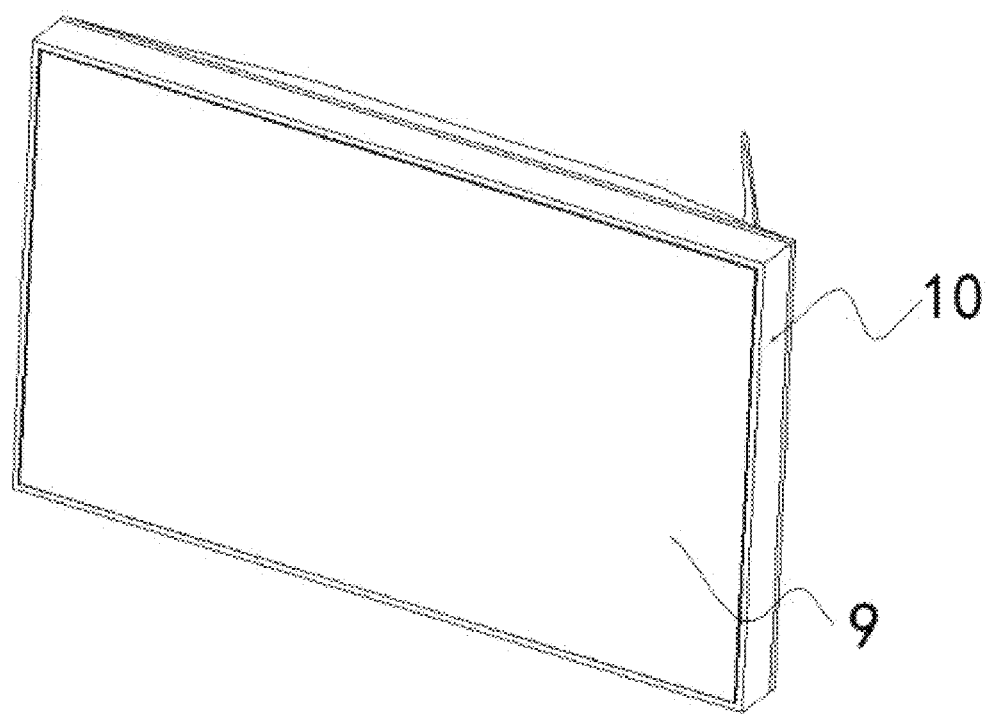
FIG. 4 is a structural schematic diagram of the protective plate and housing.
Figure 5:
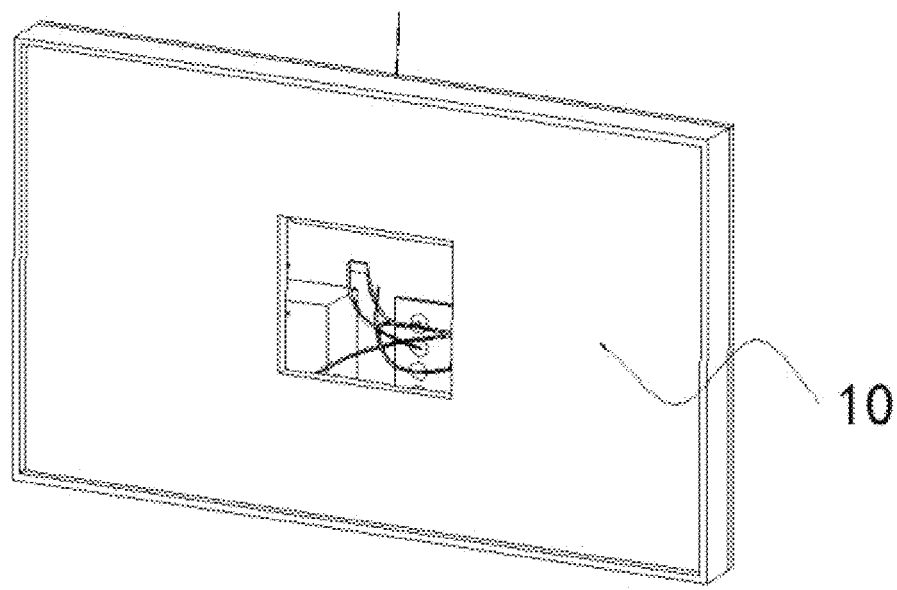
FIG. 5 is a structural schematic diagram of the housing.
Figure 6:
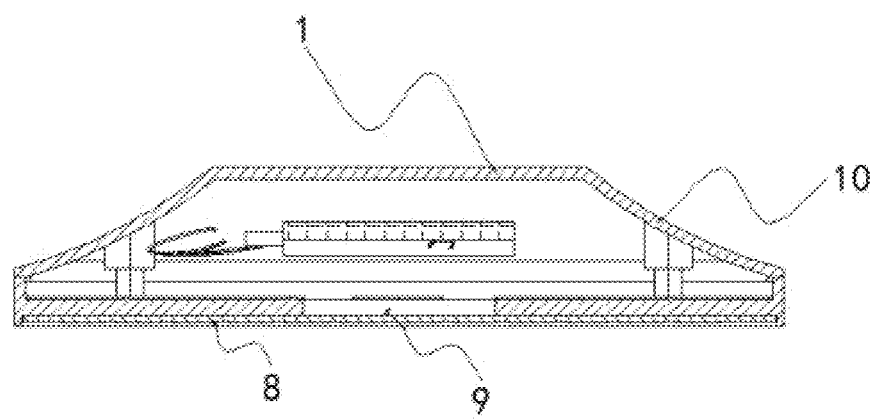
FIG. 6 is a structural schematic diagram of the solar panel, protective plate, and housing.

Referring to FIGS. 1 to 6, the novel plant growth accelerator 100 of the present disclosure includes a negative voltage device 1. The negative voltage device 1 includes a power supply assembly and a negative voltage generator 3. The power supply assembly includes a power supply 2, which is electrically connected to the negative voltage generator 3. The output terminal of the negative voltage generator 3 is electrically connected to a negative electrode 4. The negative electrode 4 can be directly or indirectly connected to the plant, either hung on the plant, inserted into the plant, or placed into the soil to provide negative electricity to the plant. The power supply assembly supplies energy to the power supply 2, enabling it to power the negative voltage generator 3.

The negative voltage generator 3 is a low-frequency negative voltage generator, with the specific model being ZH20. It promotes plant growth while minimizing adverse effects on the plant. The negative voltage generator 3 generates a negative high-voltage microcurrent to stimulate plant growth. By configuring the negative voltage generator 3 to produce this microcurrent and connecting it to the plant via the negative electrode 4, the plant gains more internal electrons, facilitating electron migration and enhancing growth. This method also helps reduce pests. Additionally, the negative charge promotes the plant's absorption of potassium, nitrogen, phosphorus, and other nutrients, further accelerating growth. The device can be hung on the plant without burning its roots, ensuring simplicity, safety, and a positive user experience.

In specific implementations, the DC or AC input to the negative voltage generator 3 undergoes EMI processing and lightning protection circuits before passing through a pulse circuit for overvoltage and current limiting. After high-low voltage isolation and other circuits, it is stepped up to high-voltage AC, which is then rectified and filtered using specialized electronic materials to produce a pure DC negative high voltage, which is transmitted to the plant via the electrode tip. The negative electrode 4 can be inserted into the plant's roots or stems, hung on the plant, or even lightly placed on it, as the tip of the negative electrode 4 discharges.

High-voltage negative charge forms a negative electric potential field at plant roots, driving positively charged particles through electroosmosis. The high-voltage negative charge reduces the potential on the outer surface of the cell membrane (e.g., from −70 mV to −50 mV), narrowing the transmembrane potential difference, enhancing proton pump activity, and acidifying the cell wall (pH decreases by 0.4-0.6), promoting cell elongation (e.g., cucumber stem elongation rate increases by 22%). $K^+$ efflux channels are close, $Ca^{2+}$ influx channels are open, and intracellular $Ca^{2+}$+ concentration rises (triggering downstream signaling).

High-voltage negative charge (e.g., −5 kV pulses) stimulates root NADPH oxidase (RbohD) to produce superoxide anions, with ($O_2^-$), $H_2O_2$ concentration rising to 1.5 times within 30 minutes, activating the MAPK signaling pathway and inducing a 3-fold upregulation of auxin (IAA) synthesis gene (YUCCA6) expression (Arabidopsis experiment).

The cathode electric field promotes the polar distribution of PIN2 protein (auxin efflux carrier) in root tip cells, increasing auxin transport rate to the root tip by 40%. The negative electric field stimulates IPT3 gene expression in root tip cells, elevating cytokinin (ZR) content in maize roots by 25% and increasing lateral root count by 35%.

In the cathode zone, pH increases (due to $H^+$ being consumed to generate $H_2$), promoting the proliferation of alkaliphilic microorganisms (e.g., nitrogen-fixing bacteria *Azospirillum*), increasing soybean root nodules by 50%. A negative electric field (−3 kV/m) can eliminate 80% of *Fusarium* in the rhizosphere, reducing soil-borne disease risks.

After high-voltage negative charge treatment on leaves, the stability of PSII reaction center D1 protein improves, with light energy conversion efficiency (ΦPSII) increasing by 12%. The negative electric field reduces $K^+$ efflux in guard cells, expanding stomatal aperture by 15% and increasing $CO_2$ absorption rate by 20%.

Understandably, high-voltage negative charge promotes plant growth through a multi-cascade reaction of ion accumulation-membrane polarization-ROS signaling-hormone regulation, essentially utilizing electric field polarity to directionally regulate plant physiological processes.

In other embodiments (not shown), the negative voltage generator 3 adopts a full-bridge LLC resonant topology, with the resonant capacitor using an 0805 package MLCC made of a C0G material, and the inductance value set to 68 μH. When the power supply 2 inputs 12 V DC, a continuously adjustable output of −1 kV to −5 kV is obtained through frequency modulation (80-150 kHz). The biomimetic micropillar array (4a) of the negative electrode 4 is fabricated using PDMS replica molding technology, with a pillar height of 500 μm, a diameter of 100 μm, and a spacing in a gradient distribution (150-300 μm), creating a 0.5-3 kV/cm gradient field in the contact interface.

The negative voltage device 1 also includes a housing 10. The negative voltage generator 3 is installed inside the housing 10, and the power supply assembly further includes a solar panel 8. The solar panel 8 is mounted on the housing 10 and electrically connected to the power supply 2. The solar panel 8 is typically used outdoors, placed in sunny locations to supply power to the power supply 2.

A protective plate 9, which fits against the solar panel 8, is slidably installed inside the housing 10. When the solar panel 8 is not in use, inserting the protective plate 9 into the housing 10 forms a protective enclosure for the solar panel 8 with the housing 10 and the protective plate 9.

In specific implementations, a solar charge controller, an energy storage battery bank, and an inverter are arranged between the solar panel 8 and the power supply 2. The solar charge controller, energy storage battery bank, and inverter are all installed inside the housing 10, with electrical connections between the solar panel 8, solar charge controller, energy storage battery bank, inverter, and power supply 2.

The solar charge controller serves as the first-stage regulation device in the photovoltaic system, optimizing the output power of the solar panel 8 and protecting the energy storage equipment. The MPPT controller adjusts the unstable DC output of the solar panel 8 to a voltage range suitable for the battery by tracking the maximum power point (MaxPowerPointTracking) in real-time, while preventing reverse current flow from the battery at night. The PWM controller achieves similar functionality through pulse-width modulation but with slightly lower efficiency than MPPT.

The energy storage battery bank acts as an energy buffer unit, storing surplus electricity and releasing it during insufficient sunlight. Lead-acid or lithium-ion batteries should be selected based on application scenarios—for example, deep-sea equipment requires corrosion-resistant energy storage batteries. The battery bank capacity must match load requirements and solar fluctuation cycles.

If the load requires AC power, an inverter is needed to convert the DC power from the battery into stable AC power (such as 220 V/50 Hz), which is then supplied to power supply 2 through a voltage stabilizing circuit for stable charging. For DC loads, a DC-DC conversion module is required to boost or buck the battery voltage to the value required by the load, supporting a wide input range (2.8-40V) and high-power output (200 W), with intelligent protection mechanisms (overcurrent, overvoltage, overtemperature) ensuring system safety.

In other embodiments (not shown), the power supply assembly is an external power source connected to power supply 2 to provide power, typically used indoors, where the external power source is mains power.

In other embodiments (not shown), the power supply assembly is a rechargeable battery used to power power supply 2, generally for indoor use.

The exterior of housing 10 is provided with a USB charging interface 21, allowing power supply 2 to be charged using a 5V mobile phone charger.

In other embodiments (not shown), the power supply 2 is a wireless power supply module, including a receiving coil (2c) and a resonant capacitor (2d), operating at a frequency of 6.78 MHz with a transmission efficiency of 75%. The negative electrode 4 is made of a conductive hydrogel material with a volume resistivity of 1-10 $\Omega \cdot cm$ and a water content of ≥80%.

In other embodiments (not shown), power supply 2 uses a high-capacity lithium-ion battery charged via a USB port, suitable for environments without light.

The negative electrode 4 is electrically connected to the negative voltage generator 3 via a wire 5, making the installation and connection of the negative electrode 4 more convenient.

The exterior of housing 10 is equipped with a switch 6 electrically connected to the negative voltage generator 3, facilitating the control of activation and deactivation of the negative voltage generator 3.

The interior of housing 10 houses a control circuit board 7 electrically connected to the negative voltage generator 3. Through the control circuit board 7, the negative voltage generator 3 can be adjusted to deliver varying voltages, currents, and frequencies based on different plants—high negative voltage (-6000V to -5000V) with microcurrent for large plants use, while lower negative voltage (-2000V to -100V) with microcurrent for small plants.

In other embodiments (not shown), the negative voltage generator 3 is equipped with a rotary knob adjuster, allowing users to manually select preset voltage levels (e.g., "large trees" or "herbaceous plants" modes), with the control circuit board 7 automatically matching the corresponding current and frequency parameters.

In other embodiments (not shown), the control circuit board 7 includes a voltage monitoring function that alerts the user via an indicator light when the power level falls below a threshold.

The negative electrode 4 is equipped with a mounting hole for easy attachment to plants.

In other embodiments (not shown), the negative electrode 4 adopts a magnetic adsorption or clamping structure to accommodate different plant morphologies.

From the above description, it can be seen that the aforementioned embodiments of the present disclosure achieve the following technical effects: by configuring the negative voltage generator 3 to produce negative high-voltage microcurrent and connecting it to plants via the negative electrode 4, since the primary energy source for plant growth is photosynthesis and light irradiation promotes molecular movement, the connection of the negative electrode 4 to plants increases internal electrons and facilitates greater electron migration, thereby promoting plant growth; this also has a pest-reducing effect; additionally, the negative charge helps enhance the absorption of potassium, nitrogen, phosphorus, and other substances by plants, further stimulating their growth; moreover, the negative electrode 4 can be attached to plants without burning their roots, offering simplicity, safety, and a positive user experience.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A plant growth accelerator, comprising:
a negative voltage device, wherein the negative voltage device comprises a negative voltage generator configured to produce a negative high-voltage microcurrent continuously adjustable from −1 kV to −5 kV; and
a negative electrode electrically connected to an output terminal of the negative voltage generator, wherein the negative electrode is configured to be directly or indirectly connected to plants;
wherein the plant growth accelerator has a plant connection configured for connecting the negative voltage generator to the plants, the plant connection consisting of the negative electrode.

2. The plant growth accelerator according to claim 1, wherein the negative voltage device further comprises a power supply assembly, and the power supply assembly comprises a power supply, wherein the power supply is electrically connected to the negative voltage generator.

3. The plant growth accelerator according to claim 2, wherein the negative voltage device further comprises a housing, and the negative voltage generator is disposed inside the housing.

4. The plant growth accelerator according to claim 3, wherein the power supply assembly further comprises a solar panel, which is mounted on the housing, wherein the solar panel is electrically connected to the power supply.

5. The plant growth accelerator according to claim 4, wherein a protective plate is slidably disposed inside the housing and fits against the solar panel.

6. The plant growth accelerator according to claim 3, wherein a USB charging interface is provided on an outer side of the housing.

7. The plant growth accelerator according to claim 3, wherein a switch electrically connected to the negative voltage generator is provided on the outer side of the housing.

8. The plant growth accelerator according to claim 3, wherein a control circuit board electrically connected to the negative voltage generator is disposed inside the housing.

9. The plant growth accelerator according to claim 2, wherein the power supply is a battery, and the battery is electrically connected to the negative voltage generator.

10. The plant growth accelerator according to claim 2, wherein the power supply is configured to be connected to mains power, and the mains power is electrically connected to power the negative voltage generator.

11. The plant growth accelerator according to claim 1, wherein the negative electrode is electrically connected to the negative voltage generator via a wire.

12. The plant growth accelerator according to claim 1, wherein the negative voltage generator produces negative high-voltage microcurrent.

13. The plant growth accelerator according to claim 1, wherein the negative voltage generator is a low-frequency negative voltage generator.

14. A plant growth accelerator, comprising:
a negative voltage device, wherein the negative voltage device comprises a power supply assembly and a negative voltage generator configured to produce a negative high-voltage microcurrent continuously adjustable from −1 kV to −5 kV; and
wherein the power supply assembly comprises a power supply that is electrically connected to the negative voltage generator;
a negative electrode electrically connected to an output terminal of the negative voltage generator, wherein the negative electrode is directly or indirectly connected to plants;
wherein the plant growth accelerator has a plant connection configured for connecting the negative voltage generator to the plants, the plant connection consisting of the negative electrode; and
wherein the negative voltage device comprises a housing, and the power supply assembly further comprises a solar panel, wherein the solar panel is disposed on the housing, and the solar panel is electrically connected to the power supply.

15. The plant growth accelerator according to claim 14, wherein the negative voltage generator is disposed inside the housing, and the housing is slidably provided with a protective plate that fits against the solar panel.

16. The plant growth accelerator according to claim 14, wherein the negative electrode is electrically connected to the negative voltage generator via a wire, and a USB charging interface is provided on an outer side of the housing.

17. The plant growth accelerator according to claim 14, wherein a switch electrically connected to the negative voltage generator is provided on the outer side of the housing; and
the housing is internally provided with a control circuit board electrically connected to the negative voltage generator.

18. The plant growth accelerator according to claim 14, wherein the negative voltage generator is a low-frequency negative voltage generator, and the negative voltage generator produces negative high-voltage microcurrent.

* * * * *